US008725296B2

(12) United States Patent
Nagasaka et al.

(10) Patent No.: US 8,725,296 B2
(45) Date of Patent: May 13, 2014

(54) GRIPPING JUDGMENT APPARATUS AND GRIPPING JUDGMENT METHOD

(75) Inventors: Kenichiro Nagasaka, Tokyo (JP); Toshimitsu Tsuboi, Tokyo (JP); Atsushi Miyamoto, Kanagawa (JP); Yasunori Kawanami, Tokyo (JP); Tetsuharu Fukushima, Tokyo (JP); Kenta Kawamoto, Tokyo (JP)

(73) Assignee: Sony Corporation, Tokyo (JP)

( * ) Notice: Subject to any disclaimer, the term of this patent is extended or adjusted under 35 U.S.C. 154(b) by 571 days.

(21) Appl. No.: 13/023,797

(22) Filed: Feb. 9, 2011

(65) Prior Publication Data

US 2011/0238213 A1    Sep. 29, 2011

(30) Foreign Application Priority Data

Mar. 24, 2010 (JP) ................................ 2010-068274

(51) Int. Cl.
  *B25J 13/08* (2006.01)
  *B25J 15/08* (2006.01)

(52) U.S. Cl.
  USPC ............... 700/263; 700/219; 901/15; 901/32

(58) Field of Classification Search
  USPC ................ 700/219, 250, 253, 258, 260, 261; 901/11, 14–18, 30–36
  See application file for complete search history.

(56) References Cited

U.S. PATENT DOCUMENTS

| 7,324,872 | B2 | 1/2008 | Nagasaka | |
|---|---|---|---|---|
| 7,984,658 | B2* | 7/2011 | Kishida et al. | 73/862.391 |
| 2007/0010913 | A1* | 1/2007 | Miyamoto et al. | 700/264 |
| 2008/0202202 | A1* | 8/2008 | Ueda et al. | 73/9 |
| 2008/0240511 | A1* | 10/2008 | Ban et al. | 382/108 |
| 2009/0018700 | A1* | 1/2009 | Okamoto et al. | 700/260 |
| 2009/0031825 | A1* | 2/2009 | Kishida et al. | 73/862.621 |
| 2009/0069942 | A1* | 3/2009 | Takahashi | 700/260 |
| 2009/0076657 | A1* | 3/2009 | Tsuboi et al. | 700/275 |
| 2009/0105880 | A1* | 4/2009 | Okazaki | 700/258 |
| 2009/0272585 | A1 | 11/2009 | Nagasaka | |

FOREIGN PATENT DOCUMENTS

| JP | 2007-30054 | 2/2007 |
|---|---|---|
| JP | 2007-276112 | 10/2007 |
| JP | 2009-34742 | 2/2009 |
| JP | 2009-36557 | 2/2009 |
| JP | 2009-56513 | 3/2009 |
| JP | 2009-66685 | 4/2009 |
| JP | 2009-269102 | 11/2009 |

* cited by examiner

*Primary Examiner* — Jason Holloway
(74) *Attorney, Agent, or Firm* — Oblon, Spivak, McClelland, Maier & Neustadt, L.L.P.

(57) ABSTRACT

There is provided a gripping judgment apparatus including a plan unit that generates a target orbit for moving a gripping unit in a state in which an object as a gripping target is gripped by the gripping unit, an observation unit that measures movement of the gripping unit driven based on the target orbit, a gripping state judgment unit that judges whether or not an object as a gripping target is grippable based on a target value of the gripping unit derived from the target orbit and an actual measured value measured by the observation unit, and a gripping state change unit that changes a gripping state of an object gripped by the gripping unit based on a judgment result obtained by the gripping state judgment unit.

8 Claims, 8 Drawing Sheets

GRIPPING JUDGMENT APPARATUS AND GRIPPING JUDGMENT METHOD

BACKGROUND OF THE INVENTION

1. Field of the Invention

The present invention relates to a gripping judgment apparatus and a gripping judgment method.

2. Description of the Related Art

In recent years, robots that autonomously move and perform various tasks have been implemented. The autonomous mobile robots are expected to perform tasks in environments where a human being cannot easily enter such as a maintenance task in a nuclear plant, a rescue task in a disaster site, or a task in a cosmic space.

Meanwhile, expectations on introducing the autonomous mobile robots into homes and helping users at home have increased. For example, as livelihood support for the elderly or wheel chair users, the autonomous mobile robot can perform a task physically difficult for the user on behalf of the user, so that a burden of the user can be alleviated.

For example, in the case of having the robot tidy up a room, the robot performs an operation of gripping an object placed in a room and moving the object to a predetermined position. At this time, since an object that is not allowed to be moved, an object that is difficult to move, and an object that is difficult to grip should not be tidied up, the robot needs to judge whether or not an object to move is grippable or whether or not it is movable. Even in a scene other than a tidying task, the judgment is important when performing an operation of gripping an object or an operation of moving a gripped object.

Here, a variety of methods have been proposed on a gripping control method of gripping an object through a robot hand and the like as well. For example, Japanese Patent Application Laid-Open (JP-A) No. 2009-56513 discloses a gripping position and posture judgment method of correcting a computed gripping position and posture to a gripping position and posture within a movement range when the computed gripping position and posture are outside a movement range of an arm and a hand. Further, Japanese Patent Application Laid-Open (JP-A) No. 2007-276112 discloses a robot hand apparatus that judges whether or not reaction force computed during an operation of placing an object exceeds a threshold value and judges a timing suitable for releasing an object regardless of a shape of an object or a direction in which an object is gripped. According to the techniques, using the robot hand, it is possible to move an object with a high degree of certainty and place the moved object without causing shock.

SUMMARY OF THE INVENTION

However, in JP-A No. 2009-56513, whether or not an object is grippable is geometrically judged to control the gripping position and posture of the arm and the hand. For this reason, for example, even if a part of an object such as a leg of a chair that is partially viewed is geometrically grippable, a situation in which the whole object (for example, a chair itself) is difficult to move may occur. Thus, there has been a problem in that it may be erroneously judged whether or not an object is grippable.

Further, in JP-A No. 2007-276112, it is an object to place an object without causing shock to the object, and a judgment on whether or not the object is grippable is not considered.

As described above, according to the conventional arts, an operation of gripping and moving an object can be performed, but whether or not an object as a gripping target is grippable or whether or not an object is movable is not considered.

Thus, there is a possibility that the robot hand will grip and move an object that is not allowed to be gripped or an object that is difficult to move. Further, if the robot hand forcibly grips and moves an object, the object or the robot hand may be broken.

In light of the foregoing, it is desirable to provide a novel and improved gripping judgment apparatus and gripping judgment method in which whether or not an object as a grip target is grippable can be accurately judged.

According to an embodiment of the present invention, there is provided a gripping judgment apparatus including a plan unit that generates a target orbit for moving a gripping unit in a state in which an object as a gripping target is gripped by the gripping unit, an observation unit that measures movement of the gripping unit driven based on the target orbit, a gripping state judgment unit that judges whether or not an object as a gripping target is grippable based on a target value of the gripping unit derived from the target orbit and an actual measured value measured by the observation unit, and a gripping state change unit that changes a gripping state of an object gripped by the gripping unit based on a judgment result obtained by the gripping state judgment unit.

Here, the gripping state judgment unit may judge that the object is not grippable when a deviation between the target value and the actual measured value is equal to or more than a predetermined value.

Moreover, the observation unit may measure a position of the gripping unit, and the gripping state judgment unit may judge whether or not an object as a gripping target is grippable based on a deviation between an actual measured position of the gripping unit measured by the observation unit and a target position of the gripping unit derived from the target orbit.

Alternatively, the observation unit may measure acting force acting on the gripping unit when moving the gripping unit in a state in which the object is gripped, and the gripping state judgment unit may judge whether or not an object as a gripping target is grippable based on a deviation between actual measured acting force acting on the gripping unit measured by the observation unit and target acting force acting on the gripping unit derived from the target orbit.

Moreover, the observation unit may measure a skidding amount occurring between the gripping unit and the object when the object is gripped, and the gripping state judgment unit may judge that an object as a gripping target is not grippable when gripping force of the gripping unit on the object is equal to or more than an allowable value and the observation unit may measure that skidding occurs between the gripping unit and the object.

the gripping state change unit may stop gripping the object by the gripping unit when the gripping state judgment unit may judge that the object is not grippable.

Furthermore, the gripping judgment apparatus may include a gripping state storage unit that stores a judgment result of an object in which a gripping possibility is judged by the gripping state judgment unit and a spatial position of the object in association with each other as an environment map.

At the time, the plan unit may judge whether or not an object as a gripping target is not grippable through the gripping state storage unit, and may decide not to grip the object when it is judged that the object is not grippable.

According to another embodiment of the present invention, there is provided a gripping judgment method, including the steps of generating a target orbit for moving a gripping unit in a state in which an object as a gripping target is gripped by the gripping unit, measuring movement of the gripping unit driven based on the target orbit, judging whether or not an object as a gripping target is grippable based on a target value of the gripping unit derived from the target orbit and an actual measured value representing measured movement of the gripping unit, and changing a gripping state of an object gripped by the gripping unit based on a judgment result.

As described above, according to the present invention, it is possible to provide a gripping judgment apparatus and a gripping judgment method in which whether or not an object as a grip target is grippable can be accurately judged.

DETAILED DESCRIPTION OF THE EMBODIMENT(S)

Figure 1:
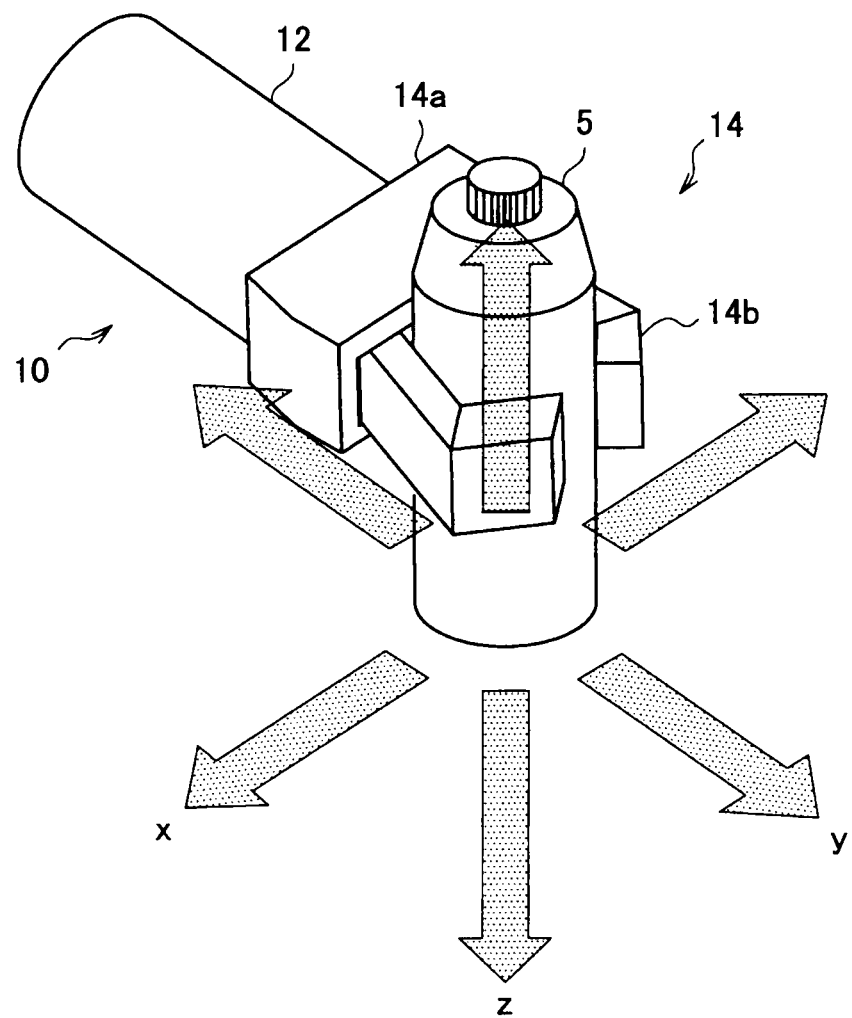
FIG. 1 is an explanation diagram illustrating an example of a state in which an object is gripped by a hand unit of a manipulator.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Further, a description will be made in the following order:
1. A configuration of a gripping judgment apparatus;
2. A gripping judgment method;
2-1. A gripping judgment based on a hand position;
2-2. A gripping judgment based on acting force acting on a hand unit;
2-3. A gripping judgment based on a skidding amount of a hand unit; and
3. A hardware configuration example.

<1. A Configuration of a Gripping Judgment Apparatus>

Figure 2:
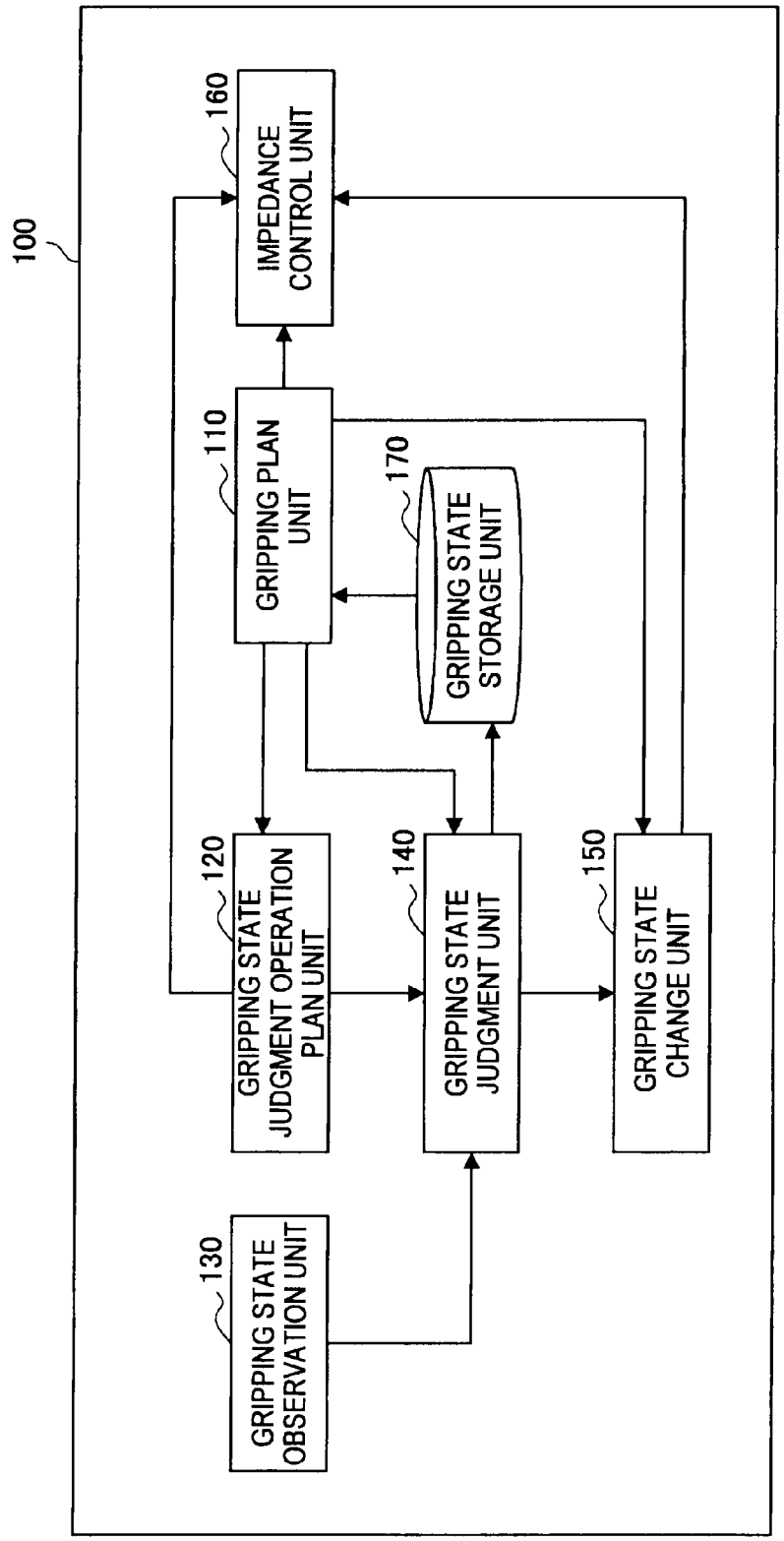
FIG. 2 is a block diagram illustrating a functional configuration of a gripping judgment apparatus according to an embodiment of the present invention.
Figure 3:
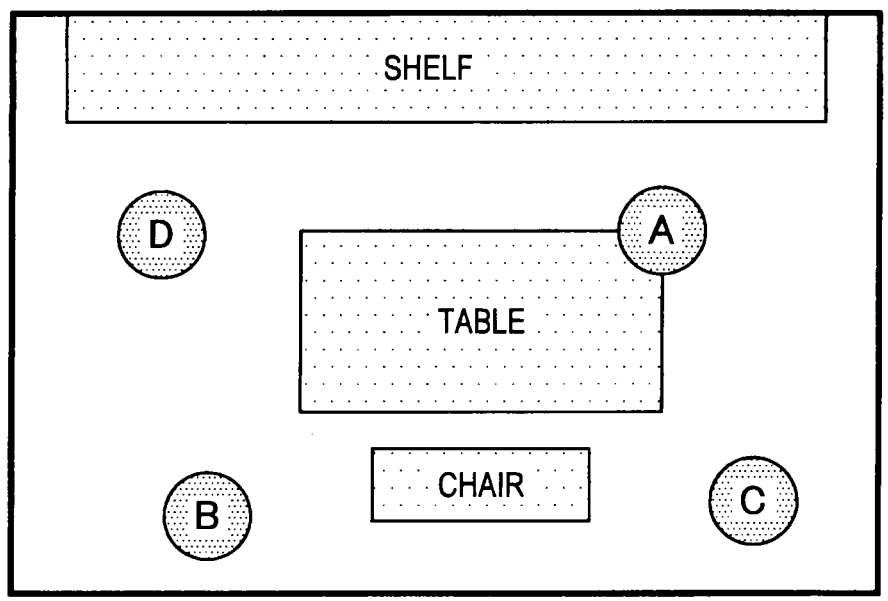
FIG. 3 is an explanation diagram illustrating an example of information stored in a gripping state storage unit according to the same embodiment.

First, a configuration of a gripping judgment apparatus 100 according to an embodiment of the present invention will be described with reference to FIGS. 1 to 3. FIG. 1 is an explanation diagram illustrating an example of a state in which an object is gripped by a hand unit 14 of a manipulator 10. FIG. 2 is a block diagram illustrating a functional configuration of the gripping judgment apparatus 100 according to the present embodiment. FIG. 3 is an explanation diagram illustrating an example of information stored in a gripping state storage unit 170 according to the present embodiment.

[An Overview of the Gripping Judgment Apparatus]

The gripping judgment apparatus 100 according to the present embodiment is an apparatus for judging whether or not an object as a gripping target is grippable when a manipulator 10 capable of gripping and moving the object grips the object, for example, as illustrated in FIG. 1. The gripping judgment apparatus 100 may be disposed in a control apparatus (not shown) that controls the manipulator 10. For example, if the autonomous mobile robot includes the manipulator 10, the gripping judgment apparatus 100 may be disposed in a control apparatus (not shown) that generally controls the robot.

Here, the manipulator 10 according to the present embodiment includes an arm unit 12 and a hand unit 14 that grips an object 5 as illustrated in FIG. 1. The arm unit 12 includes one or more links and has one end that is disposed to be movable, for example, on a base of a body section or the like of a robot (not shown). The hand unit 14 is movably connected to the other end (a front end) of the arm unit 12. The hand unit 14 includes a connection section 14a connected with the arm unit 12 and two finger sections 14b that protrude from the connection section 14a. Further, three or more finger sections 14b may be disposed. The finger sections 14b can grip the object 5 as the gripping target by sandwiching the object 5 therebetween or enfolding the object 5.

As described above, when actively gripping the object through the manipulator 10, the gripping judgment apparatus 100 judges whether or not the object 5 is grippable. In the present embodiment, "grippable" means that it is possible to grip an object and move a gripped object. On the other hand, "not grippable" means that it is difficult to grip an object or move a gripped object or that a gripped object is prevented from being moved. The non-grippable object (hereinafter, referred to as "an immobile object") includes, for example, an object that has a feature of being heavy, slippery, large, lengthy, and unstable and is difficult to move, or an object that has a feature of being easy to break and is not allowed to be gripped. Further, an object that should always be at a predetermined position like a table and an object that is prevented from moving like an object connected with another object by a cable are also non-grippable objects. A case in which it is erroneously judged that there is nothing is also a non-grippable state.

After the hand unit 14 of the manipulator 10 grips the object 5, the gripping judgment apparatus 100 moves the manipulator 10 and then judges whether or not the manipulator 10 performed the same operation as a target operation under the assumption that the object 5 is the grippable object. If it is judged that the manipulator 10 performed the same operation as the target operation, the gripping judgment apparatus 100 judges that the object 5 is the grippable object. However, when it is judged that the manipulator 10 performed an operation different from the target operation, the gripping judgment apparatus 100 judges that the object 5 is the non-grippable object.

As described above, by judging whether or not the object to be gripped by the hand unit 14 is grippable through the gripping judgment apparatus 100, before the manipulator 10 grips the object and starts its operation, it can be judged whether or not it is allowed to execute the operation, whereby a proper operation can be performed.

[A Functional Configuration of the Gripping Judgment Apparatus]

The gripping judgment apparatus 100 includes a gripping plan unit 110, a gripping state judgment operation plan unit 120, a gripping state observation unit 130, a gripping state judgment unit 140, a gripping state change unit 150, an impedance control unit 160, and a gripping state storage unit 170 as illustrated in FIG. 2.

The gripping plan unit 110 decides an orbit for moving the hand unit 14 that grips the object up to a gripping point of the object. The gripping plan unit 110 first decides the gripping point, which is a position for gripping the object specified as the gripping target, using a well-known existing technique. The gripping plan unit 110 generates a target orbit for moving the hand unit 14 from a current position to the gripping point. By controlling the manipulator 10 through the impedance control unit 160, which will be described later, so that the hand unit 14 can move along the target orbit, it is possible to grip the object through the hand unit 14. Further, the gripping plan unit 110 can plan an orbit for moving the hand unit 14 that gripped the object to the target position. The target orbit generated by the gripping plan unit 110 is output to the gripping state judgment operation plan unit 120, the gripping state judgment unit 140, the gripping state change unit 150, and the impedance control unit 160.

Further, the gripping plan unit 110 confirms whether or not the object as the gripping target has been previously judged as not grippable by referring to the gripping state storage unit 170, which will be described later. As a result of confirmation, when the object has been judged as not grippable, the gripping plan unit 110 decides not to perform gripping on the object.

The gripping state judgment operation plan unit 120 generates a target orbit of an operation for judging whether or not the object as the gripping target is grippable (a gripping state judgment operation). The gripping state judgment operation refers to an operation for moving the hand unit 14 in a state in which the object is gripped. In the gripping state judgment operation, it is necessary not to greatly move the hand unit 14 but to move it within a degree in which a difference between the target orbit and an actual orbit of the hand unit 14 can be detected. The gripping state judgment operation may be defined as an operation for moving in a left-right direction (an x-axial direction), a front-rear direction (a y-axial direction), and an up-down direction (a z-axial direction) by a predetermined distance, respectively, in a state in which the hand unit 14 of the manipulator 10 grips the object 5, for example, as illustrated in FIG. 1. By executing the gripping state judgment operation through the gripping state judgment operation plan unit 120 as described above, before gripping and moving the object through the hand unit 14, it can be judged whether or not the object is grippable. The gripping state judgment operation plan unit 120 outputs the target orbit of the manipulator 10 that moves according to the gripping state judgment operation to the gripping state judgment unit 140 and the impedance control unit 160.

The gripping state observation unit 130 observes movement of the manipulator 10 to be controlled based on the target orbit. The gripping state observation unit 130 measures, as an actual measured value, a physical amount representing a spatial state of the manipulator 10, which can be derived from the target orbit generated by the gripping plan unit 110 or the gripping state judgment operation plan unit 120, such as a hand position (a specific point of the hand unit 14), acting force acting on the hand unit 14, and a skidding amount of the hand unit 14. The gripping state observation unit 130 outputs the obtained measured value to the gripping state judgment unit 140 as the observation result.

The gripping state judgment unit 140 judges the object gripping state of the hand unit 14 based on a deviation between a target value based on the target orbit of the manipulator 10 and the actual measured value obtained by the gripping state observation unit 130. The gripping state judgment unit 140 can judge the gripping state in which the hand unit 14 operates along the target orbit while gripping the object and the non-grippable state in which the object gripped by the hand unit 14 is supposed to move but does not move, is supposed to stop but moves, needs force larger than expected in moving it, and is supposed not to move on the hand unit 14 but slides. A detailed gripping state judgment process performed by the gripping state judgment unit 140 will be described later. The judgment result obtained by the gripping state judgment unit 140 is output to the gripping state change unit 150 and the gripping state storage unit 170.

The gripping state change unit 150 changes the object gripping state of the hand unit 14 based on the target orbit of the manipulator 10 generated by the gripping plan unit 110 and the judgment result obtained by the gripping state judgment unit 140. For example, the gripping state change unit 150 stops movement of the object gripped by the hand unit 14, places the objects, or opens the finger sections 14b of the hand unit 14 gripping the object. The gripping state change unit 150 outputs change information for changing the object gripping state of the hand unit 14 to the impedance control unit 160.

The impedance control unit 160 performs impedance control on the manipulator 10 and controls the position and posture of the manipulator 10. The impedance control unit 160 controls the position and posture of the manipulator 10 based on the target orbit generated by the gripping plan unit 110 or the gripping state judgment operation plan unit 120 or the change information received from the gripping state change unit 150. The gripping state observation unit 130 observes movement of the manipulator 10 that operates according to control of the impedance control unit 160.

The gripping state storage unit 170 stores information of a space where the manipulator 10 is present as an environment map. The environment map represents a spatial arrangement of an object present in a space where the manipulator 10 is present, for example, as illustrated in FIG. 3. Through the spatial map illustrated in FIG. 3, it is possible to recognize that a shelf is near a wall of a space, and a table and a chair are near the center. Further, it is possible to recognize that objects A to D are disposed in the space, and the object A is on the table.

The gripping state storage unit 170 further stores information related to the object recognized on the environment map. For example, information such as the shape of the object, the position and the posture of the object, an immobile object flag representing a gripping possibility, the weight, a tag for identifying the object (e.g., the table, the chair, the shelf, etc.), information representing whether or not the object can be moved by the user's instruction, and the movement speed of the object is stored on each object. Further, the gripping state storage unit 170 may store information relevant to gripping of the object. For example, information such as "the object A was a static environmental object (for example, a leg of a table)" or "the object B was too heavy" may be stored as the relevant information. The information stored in the gripping state storage unit 170 is updated, as needed, based on the judgment result obtained by the gripping state judgment unit 140.

<2. A Gripping Judgment Method>

The gripping judgment apparatus 100 judges whether or not the gripped object is the grippable object based on a deviation between the target value of movement of the hand unit 14 and the actual measured value when the hand unit 14 that gripped the object is moved. At this time, the gripping judgment apparatus 100, for example, may judge the gripping possibility of the object by using the physical amount such as the hand position, force acting on the hand unit 14, and the skidding amount of the object. A gripping judgment method performed by the gripping judgment apparatus 100 will be described below with reference to FIGS. 4 to 6B in connection with when the hand position, force acting on the hand unit 14, and the skidding amount of the object are used as the physical amount, which represents movement of the hand unit 14, used for judgment of the object gripping state.

[2-1. A Gripping Judgment Based on the Hand Position]

Figure 4:
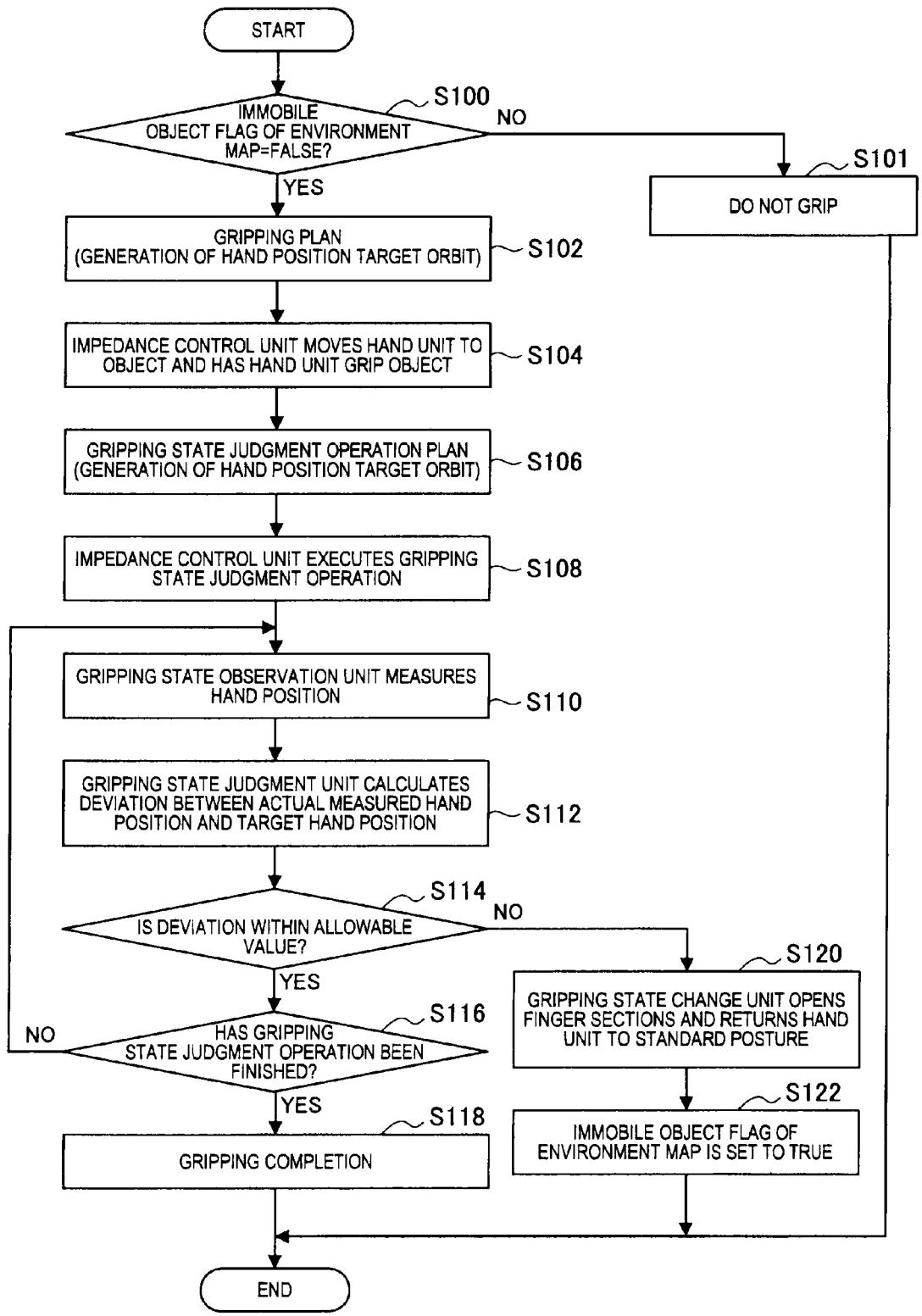
FIG. 4 is a flowchart illustrating a gripping judgment method based on a hand position.

First, a gripping judgment method of performing a gripping judgment of the object based on the hand position will be described with reference to FIG. 4. In the gripping judgment method, an arbitrary position of the hand unit 14 is set as a specific point, and the position of the specific point is set as the hand position. The gripping judgment apparatus 100 compares a target hand position derived from the target orbit in an operation of moving the object gripped by the hand unit 14 of the manipulator 10 with an actual measured hand position measured by the gripping state observation unit 130. When it is detected that a deviation between the target hand position and the actual measured hand position deviates from an allowable value range, the gripping judgment apparatus 100 judges that the gripped object has not moved as assumed and thus stops gripping the object. As described above, in the present example, the gripping judgment apparatus 100 judges the object gripping state based on the hand position when the hand unit 14 grips the object.

In the gripping judgment method, the gripping plan unit 10 confirms whether or not the object as the gripping target has been previously judged as the immobile object by referring to the environment map stored in the gripping state storage unit 170 (step S100). The environment map stores information related to the object recognized to be present in the space where the manipulator 10 is present. The information related to the object includes the immobile object flag representing whether or not the object is grippable. The immobile object flag of "false" represents the grippable object, and the immobile object flag of "true" represents the non-grippable object. If it is judged once whether or not the object is grippable, information is included in the immobile object flag. Further, in the immobile object flag on the object in which it has never been judged whether or not the object is grippable, "false" may be included or information representing that the judgment has never been performed (for example, a blank) may be included.

The gripping plan unit 110 confirms the immobile object flag of the environment map and judges whether or not the object is the immobile object, that is, whether or not the immobile object flag includes "false." When the immobile object flag is "false," it is judged that the object is grippable, and the gripping judgment apparatus 100 executes a process subsequent to step S102. Even when the judgment on whether or not the object is grippable has never been performed, the process subsequent to step S102 is executed. However, when the immobile object flag is "true," it is judged that the object is not grippable, and the gripping plan unit 110 decides not to grip the object (step S101), and finishes the process.

Subsequently, the gripping plan unit 110 generates a target orbit (a first target orbit) of the hand unit 14 for gripping the object (step S102). The gripping plan unit 110 generates the first target orbit for moving the hand unit 14 from the present position to the gripping point of the object as the gripping target and outputs the first target orbit to the impedance control unit 160. The impedance control unit 160 moves the hand unit 14 to the gripping point of the object along the first target orbit and has the hand unit 14 grip the object (step S104).

If the object is gripped by the hand unit 14, the gripping state judgment operation plan unit 120 generates a target orbit (a second target orbit) of the hand unit 14 in order to perform the gripping state judgment operation for judging whether or not the object as the gripping target is grippable (step S106).

The gripping state judgment operation plan unit 120 generates the second target orbit for moving the hand unit 14 that grips the object in a predetermined direction from the present position. The second target orbit generated by the gripping state judgment operation plan unit 120 is output to the impedance control unit 160. The impedance control unit 160 causes the hand unit 14 to perform the gripping state judgment operation according to the second target orbit (step S108).

Movement of the manipulator 10 according to control of the impedance control unit 160 in step S108 is observed by the gripping state observation unit 130. In the present example, the gripping state observation unit 130, for example, measures a spatial state of each of parts that construct the manipulator 10 and kinematically computes the hand position (that is, the position of the specific point of the hand unit 14) based on the measured physical amount. The computed actual measured hand position is output to the gripping state judgment unit 140.

Here, the manipulator 10 according to the present embodiment may be constructed so that control can be performed such that drag force is added to gravity by gravity compensation control and thereafter a control amount for maintaining a part such as the hand unit 14 in a predetermined state is further added. This reduces force required for control of the hand position even though force required for gravity compensation control is large.

At this time, if the manipulator 10 includes an ideal joint with a built-in torque sensor, the hand position can be moved and stopped at a predetermined position by very small force. If the ideal joint is not included, a very high feedback gain is required to stop the hand position at a predetermined position, and in spite of an attempt to move the hand position, it is difficult to easily move the hand. In this case, it is difficult to measure a change in hand position, and it is difficult to judge the gripping state based on the position of the hand unit 14 as in the present example. Thus, in the manipulator 10 that can be controlled by the torque sensor, by applying the gravity compensation control, the judgment of the gripping state of the present exemplary embodiment can be implemented.

Thereafter, the gripping state judgment unit 140 computes a deviation between the target hand position based on the second target orbit and the actual measured hand position (step S112). The gripping state judgment unit 140 derives a target position of the hand unit 14 (a target hand position) based on second orbit information generated by the gripping state judgment operation plan unit 120 and computes a deviation between the target hand position and the actual measured hand position of the hand unit 14 observed by the gripping state observation unit 130. The computed deviation represents the magnitude of misalignment between ideal movement in which the hand unit 14 that gripped the object moves along the second target orbit and actual movement measured by the gripping state observation unit 130.

When the deviation between the target hand position and the actual measured hand position is computed, the gripping state judgment unit 140 judges whether or not the deviation is within the allowable value range (step S114). A limit value of misalignment between the target hand position in which the manipulator 10 can be recognized as having operated along the second target orbit and the actual measured hand position is set to the allowable value. When it is judged that the computed deviation is within the allowable value range, the gripping state judgment unit 140 judges that the hand unit 14 moved along the second target orbit and judges that the object gripped by the hand unit 14 is the grippable object.

Thereafter, the gripping state judgment unit 140 judges whether or not the gripping state judgment operation has been finished (step S116). When the operation has not been finished yet, the process starting from step S110 is repeated. However, when it is judged that the gripping state judgment operation has been finished, the gripping state judgment unit 140 judges that gripping of the object has been completed and finishes the process (step S118). When gripping of the object has been completed, the gripping plan unit 110 generates the target orbit after object gripping. The impedance control unit 160 drives and controls the manipulator 10 based on the generated target orbit after object gripping.

Further, when it is judged in step S114 that the deviation between the target hand position and the actual measured hand position has exceeded the allowable value, the gripping state judgment unit 140 judges that the hand unit 14 has not moved along the second target orbit. Thus, the gripping state judgment unit 140 judges that the object gripped by the hand unit 14 is the non-grippable object and stops gripping by the hand unit 14. When the gripping state judgment unit 140 judges that the object is not grippable, the gripping state change unit 150 instructs the impedance control unit 160 to open the finger sections 14b of the hand unit 14 that grips the object and return to a previously set standard posture (step S120). The impedance control unit 160 drives and controls the manipulator 10 according to the instruction from the gripping state change unit 150.

The gripping state judgment unit 140 sets the immobile object flag of the object as the gripping target in the environment map of the gripping state storage unit 170 to "true" (step S122). As described above, the gripping state judgment unit 140 records the fact that the object as the gripping target was not grippable in the environment map and then finishes the process.

The gripping judgment method of performing the object gripping judgment based on the hand position has been described above. As described above, the gripping judgment apparatus 100 observes the hand position in the space and judges whether or not the object is grippable based on the deviation between the target hand position derived from the target orbit of the gripping state judgment operation and the observed actual measured hand position. That is, when the deviation between the target hand position and the actual measured hand position exceeds the allowable value, the gripping judgment apparatus 100 judges that the hand unit 14 of the manipulator 10 has not moved along the target orbit and judges that the gripped object is not grippable. As described above, in the state in which the hand unit 14 has actually gripped the object, before operating the manipulator 10, it is judged whether or not the object as the gripping target is grippable. Thus, it is possible to prevent the object that should not be gripped from being gripped or the object that is difficult to move from being moved.

[2-2. A Gripping Judgment Based on Acting Force Acting on the Hand Unit]

Figure 5:
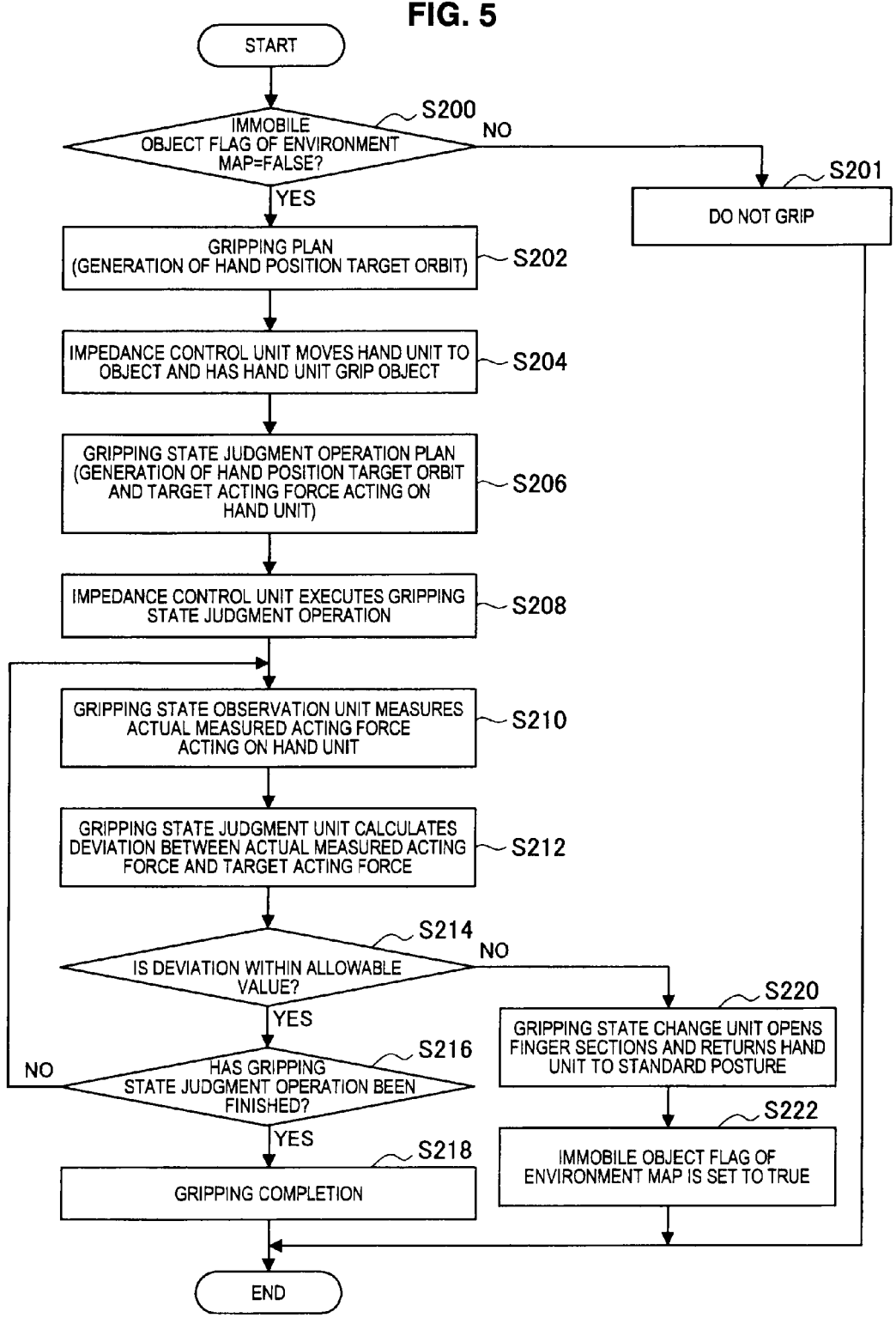
FIG. 5 is a flowchart illustrating a gripping judgment method based on acting force acting on a hand unit.

Next, a gripping judgment method of performing an object gripping judgment based on acting force acting on the hand unit 14 will be described with reference to FIG. 5. In the gripping judgment method, the acting force, which acts on the hand unit 14 when the hand unit 14 that grips the object is moved, is used for the judgment of the gripping state. The gripping judgment apparatus 100 compares target acting force on the hand unit 14 derived from the target orbit in an operation of moving the object gripped by the hand unit 14 of the manipulator 10 with actual measured acting force. When it is detected that a deviation between the target acting force and the actual measured acting force deviates from an allowable value range, the gripping judgment apparatus 100 judges that the gripped object has not been moved as assumed and stops gripping the object. As described above, in the present example, the gripping judgment apparatus 100 judges the object gripping state based on the acting force on the hand unit 14 when the hand unit 14 grips the object.

In the gripping judgment method, the gripping plan unit 10 confirms whether or not the object as the gripping target has been previously judged as the immobile object by referring to the environment map stored in the gripping state storage unit 170 (step S200). The gripping plan unit 110 confirms the immobile object flag representing whether or not the gripping target is grippable and judges whether or not the object is the immobile object, that is, whether or not the immobile object flag includes "false." When the immobile object flag is "false," it is judged that the object is grippable, and the gripping judgment apparatus 100 executes a process subsequent to step S202. However, when the immobile object flag is "true," it is judged that the object is not grippable, and the gripping plan unit 110 decides not to grip the object (step S201) and finishes the process.

Subsequently, the gripping plan unit 110 generates a target orbit (a first target orbit) of the hand unit 14 for gripping the object (step S202). If the gripping plan unit 110 generates the first target orbit for moving the hand unit 14 from the present position to the gripping point of the object as the gripping target, the impedance control unit 160 moves the hand unit 14 along the first target orbit and has the hand unit 14 grip the object (step S204). The process from step S200 to step S204 is the same as the process from step S100 to step S104 illustrated in FIG. 4.

If the object is gripped by the hand unit 14, the gripping state judgment operation plan unit 120 generates a target orbit (a second target orbit) of the hand unit 14 in order to perform the gripping state judgment operation for judging whether or not the object as the gripping target is grippable (step S206). The gripping state judgment operation plan unit 120 generates the second target orbit for moving the hand unit 14 that grips the object in a predetermined direction from the present position. The gripping state judgment operation plan unit 120 derives the target acting force acting on the hand unit 14 that grips the object from the second target orbit. The acting force applied from the object to the hand unit 14 changes depending on the shape or the weight of the object or the moving direction of the hand unit 14. In order for the gripping state judgment operation plan unit 120 to judge whether or not the hand unit 14 has moved along the second target orbit by using the acting force acting on the hand unit 14, the gripping state judgment operation plan unit 120 derives the target acting force that acts on the hand unit 14 at the time of the gripping state judgment operation.

The second target orbit generated by the gripping state judgment operation plan unit 120 is output to the impedance control unit 160. The impedance control circuit 160 causes the hand unit 14 to perform the gripping state judgment operation along the second target orbit (step S208).

Movement of the manipulator 10 according to control of the impedance control unit 160 in step S208 is observed by the gripping state observation unit 130 (step S210). In the present example, the gripping state observation unit 130 measures acting force that acts on the hand unit 14 at the time of the gripping state judgment operation. The actual measured acting force measured by the gripping state observation unit 130 is output to the gripping state judgment unit 140. Alternatively, the acting force on the hand unit 14 may be measured, for example, using a 6-axial force sensor. In the manipulator 10 that includes an ideal joint with a built-in torque sensor, the acting force on the hand unit 14 may be measured by performing external force estimation. The ideal joint with the built-in torque sensor may be configured, for example, by employing a technique disclosed in Japanese Patent Application Laid-Open (JP-A) No. 2009-269102. Further, as a method of estimating the external force, for example, a technique disclosed in Japanese Patent Application Laid-Open (JP-A) No. 2007-30054 may be used.

Thereafter, the gripping state judgment unit 140 computes a deviation between the target acting force based on the second target orbit and the actual measured acting force (step S212). The gripping state judgment unit 140 derives the target acting force on the hand unit 14 based on the second orbit information generated by the gripping state judgment operation plan unit 120 and computes a deviation between the target acting force and the actual measured acting force on the hand unit 14 observed by the gripping state observation unit 130.

When the deviation between the target acting force and the actual measured acting force is computed, the gripping state judgment unit 140 judges whether or not the deviation is within the allowable value range (step S214). A limit value of misalignment between the target acting force in which the manipulator 10 can be recognized as having operated along the second target orbit and the actual measured acting force is set to the allowable value. When it is judged that the computed deviation is within the allowable value range, the gripping state judgment unit 140 judges that the hand unit 14 has moved along the second target orbit and judges that the object gripped by the hand unit 14 is the grippable object.

Thereafter, the gripping state judgment unit 140 judges whether or not the gripping state judgment operation has been finished (step S216). When the operation has not been finished yet, the process starting from step S210 is repeated. However, when it is judged that the gripping state judgment operation has been finished, the gripping state judgment unit 140 judges that gripping the object has been completed (step S218) and finishes the process. When gripping of the object has been completed, the gripping plan unit 110 generates the target orbit after object gripping. The impedance control unit 160 drives and controls the manipulator 10 based on the generated target orbit after object gripping.

Further, when it is judged in step S214 that the deviation between the target acting force and the actual measured acting force exceeds the allowable value, the gripping state judgment unit 140 judges that the hand unit 14 has not moved along the second target orbit. Thus, the gripping state judgment unit 140 judges that the object gripped by the hand unit 14 is the non-grippable object and stops gripping by the hand unit 14. When the gripping state judgment unit 140 judges that it is not grippable, the gripping state change unit 150 instructs the impedance control unit 160 to open the finger sections 14b of the hand unit 14 that grips the object and return to a previously set standard posture (step S220). The impedance control unit 160 drives and controls the manipulator 10 according to the instruction from the gripping state change unit 150.

The gripping state judgment unit 140 sets the immobile object flag of the object as the gripping target in the environment map of the gripping state storage unit 170 to "true" (step S222). As described above, the gripping state judgment unit 140 records the fact that the object as the gripping target was not grippable in the environment map and then finishes the process.

The gripping judgment method of performing the object gripping judgment based on the acting force on the hand unit 14 has been described above. As described above, the gripping judgment apparatus 100 observes the acting force acting on the hand unit 14 and judges whether or not the object is grippable based on the deviation between the target acting force derived from the target orbit of the gripping state judgment operation and the observed actual measured acting force. That is, when the deviation between the target acting force and the actual measured acting force exceeds the allowable value, the gripping judgment apparatus 100 judges that the hand unit 14 of the manipulator 10 has not moved along the target orbit and judges that the gripped object is not grippable. As described above, in the state in which the hand unit 14 actually grips the object, before operating the manipulator 10, it is judged whether or not the object as the gripping target is grippable. Thus, it is possible to prevent the object that should not be gripped from being gripped or the object that is difficult to move from being moved.

[2-3. A Gripping Judgment Based on a Skidding Amount of the Hand Unit]

Figure 6A:
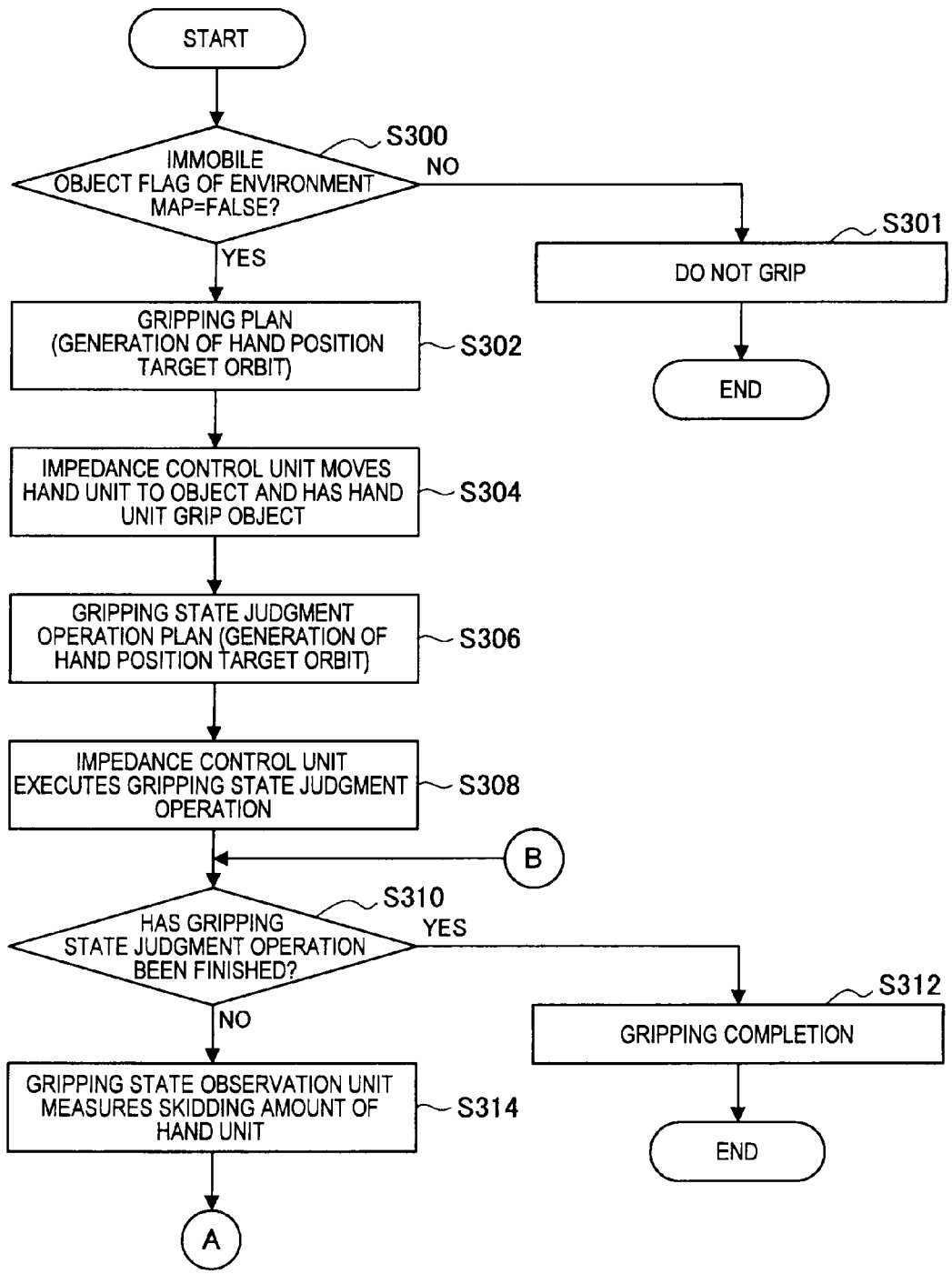
FIG. 6A is a flowchart illustrating a gripping judgment method based on a skidding amount of a hand unit.
Figure 6B:
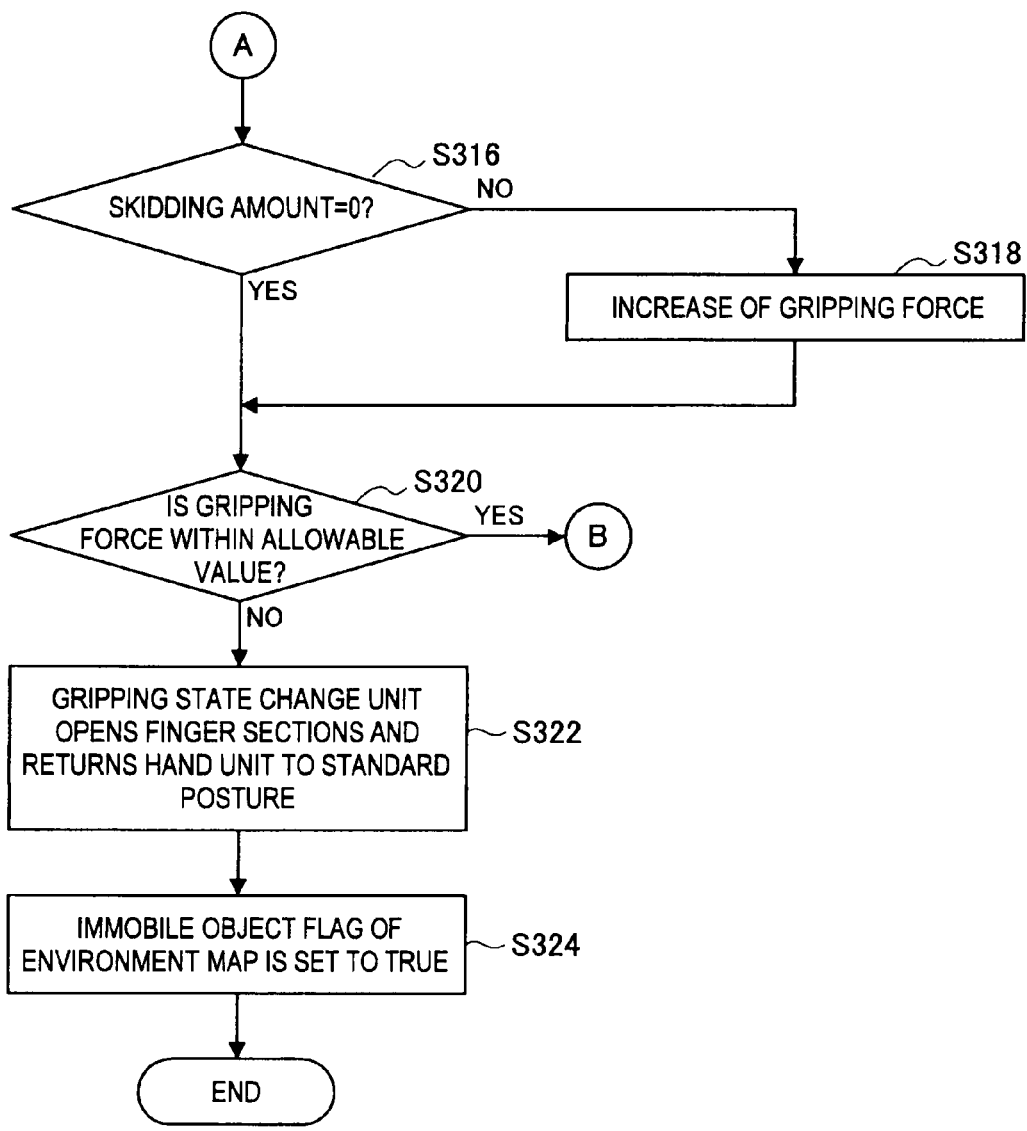
FIG. 6B is a flowchart illustrating a gripping judgment method based on a skidding amount of a hand unit.

Next, a gripping judgment method of performing an object gripping judgment based on a skidding amount of the hand unit 14 will be described with reference to FIGS. 6A and 6B. In the gripping judgment method, after the hand unit 14 of the manipulator 10 grips the object, skidding occurring between the hand unit 14 and the object is measured. The gripping judgment apparatus 100 judges whether or not the object is grippable depending on whether or not the object can be gripped within allowed gripping force in an operation of moving the object gripped by the hand unit 14 of the manipulator 10. When it is detected that the gripping force of the hand unit 14 that grips the object deviates from an allowable value, the gripping judgment apparatus 100 judges that the gripped object has not moved as assumed and stops gripping the object. As described above, in the present example, the gripping judgment apparatus 100 judges the object gripping state based on the skidding amount of the hand unit 14 that grips the object.

In the gripping judgment method, the gripping plan unit 10 confirms whether or not the object as the gripping target has been previously judged as the immobile object by referring to the environment map stored in the gripping state storage unit 170 (step S300). The gripping plan unit 110 confirms the immobile object flag representing whether or not the gripping target is grippable and judges whether or not the object is the immobile object, that is, whether or not the immobile flag includes "false." When the immobile object flag is "false," it is judged that the object is grippable, and the gripping judgment apparatus 100 executes a process subsequent to step S302. However, when the immobile object flag is "true," it is judged that the object is not grippable, and the gripping plan unit 110 decides not to grip the object (step S301) and finishes the process.

Subsequently, the gripping plan unit 110 generates a target orbit (a first target orbit) of the hand unit 14 for gripping the object (step S302). If the gripping plan unit 110 generates the first target orbit for moving the hand unit 14 from the present position to the gripping point of the object that is the gripping target, the impedance control unit 160 moves the hand unit 14 along the first target orbit and has the hand unit 14 grip the object (step S304).

If the object is gripped by the hand unit 14, the gripping state judgment operation plan unit 120 generates a target orbit (a second target orbit) of the hand unit 14 in order to perform the gripping state judgment operation for judging whether or not the object as the gripping target is grippable (step S306). The gripping state judgment operation plan unit 120 generates the second target orbit for moving the hand unit 14 that grips the object in a predetermined direction from the present position and outputs the second target orbit to the impedance control unit 160. The impedance control circuit 160 causes the hand unit 14 to perform the gripping state judgment operation along the second target orbit (step S308). The process from step S300 to step S308 is the same as the process from step S100 to step S108 illustrated in FIG. 4.

Thereafter, the gripping state judgment unit 140 judges whether or not the gripping state judgment operation has been finished (step S310). When the operation has not been finished yet, a process subsequent to S314 is executed. However, when it is judged that the gripping state judgment operation has been finished, the gripping state judgment unit 140 judges that gripping the object has been completed (step S312) and finishes the process. When gripping of the object has been completed, the gripping plan unit 110 generates the target orbit after object gripping. The impedance control unit 160 drives and controls the manipulator 10 based on the generated target orbit after object gripping.

When it is judged in step S310 that the gripping state judgment operation has not been finished yet, the gripping state observation unit 130 measures skidding (a skidding amount) occurring between the hand unit 14 and the object (step S314). When the gripping force of the hand unit 14 is weak or when the surface of the object is slick and slippery, it is not easy to grip. In this case, the hand unit 14 and the object relatively move, that is, skidding occurs. When skidding occurs between the hand unit 14 and the object, the hand unit 14 is not easily grip the object properly and so may drop the object. The gripping state judgment unit 140 judges whether there is no skidding between the hand unit 14 and the object, that is, whether or not the skidding amount is zero 0 (zero) (step S316), and confirms whether or not the hand unit 14 can properly grip the object.

In order to detect the skidding amount, a sensor that can detect skidding may be disposed on a contact surface of the finger section 14*b* that comes in contact with the object when gripping the object (see Japanese Patent Application Laid-Open (JP-A) No. 2009-36557). For example, the sensor may be configured with a capacitance-type pressure sensor that detects only pressure of a direction vertical to a sensor surface. A viscoelastic body that is transformed by force applied from the outside may be disposed on the surface of the sensor. When the viscoelastic body is transformed, the pressure is spread to the sensor. Based on a change in pressure distribution acquired by detecting the spread pressure through the sensor, the gripping judgment apparatus 100 can acquire the skidding amount used for judging the object gripping state of the hand unit 14.

When it is judged in step S316 that the skidding amount is not 0 (zero), that is, when skidding of the object on the hand unit 14 is detected, the gripping force of the hand unit 14 is increased to prevent skidding (step S318). Thereafter, the gripping state judgment unit 140 judges whether or not the gripping force of the hand unit 14 is within the allowable value (step S320). By excessively increasing the gripping force of the hand unit 14, skidding of the object is prevented, and gripping can be performed with the high degree of certainty. However, if the excessive gripping force is applied to the object, the object may become misshapen or broken. For this reason, the gripping force of the hand unit 14 should be placed within the allowable value that does not cause the object to become misshapen. Further, the allowable value is set to force that can be output from the hand unit 14, for example, based on the mechanical strength of the manipulator 10 or a specification of a motor or a gear that drives the manipulator 10.

When the gripping force of the hand unit 14 is within the allowable value, the gripping state judgment unit 140 returns to step S310 and judges whether or not the gripping state judgment operation has been finished. When the gripping state judgment operation has been finished, the gripping state judgment unit 140 judges that gripping on the object has been completed (step S312) and finishes the process. However, when the operation has not been finished yet, the process subsequent to step S314 is repetitively performed.

Further, when it is judged in step S316 that the skidding amount is 0 (zero), it is judged as the state in which skidding has not occurred between the hand unit 14 and the object. In this case, in step S320, it is judged whether or not the gripping force of the hand unit 14 is within the allowable value. When it is within the allowable value, similarly, the gripping state judgment unit 140 returns to step S310 and performs the process. However, when it is judged in step S320 that the gripping force of the hand unit 14 exceeds the allowable value, since the object may be transformed, gripping the object by the hand unit 14 is stopped. That is, the gripping state change unit 150 instructs the impedance control unit 160 to open the finger sections 14*b* of the hand unit 14 that grips the object and return to a previously set standard posture (step S322). The impedance control unit 160 drives and controls the manipulator 10 according to the instruction from the gripping state change unit 150.

The gripping state judgment unit 140 sets the immobile object flag of the object as the gripping target in the environment map of the gripping state storage unit 170 to "true" (step S324). Further, the gripping state judgment unit 140 records the fact that the object as the gripping target was not grippable in the environment map and then finishes the process.

The gripping judgment method of performing the object gripping judgment based on the skidding amount of the hand unit 14 has been described above. As described above, after the object is gripped by the hand unit 14, the gripping judgment apparatus 100 observes the amount of skidding occurring between the hand unit 14 and the object and judges whether or not the hand unit 14 can properly grip the object. At this time, it is confirmed whether or not the gripping force of the hand unit 14 is within the allowable value, and it is confirmed whether or not gripping can be performed by force that does not cause the object to become misshapen. When skidding occurs between the hand unit 14 and the object or when the object is gripped by the gripping force exceeding the allowable value, it is judged that it is difficult to grip the object by the hand unit 14. As described above, in the state in which the hand unit 14 actually grips the object, before operating the manipulator 10, it is judged whether or not the object as the gripping target is grippable. Thus, it is possible to prevent the object that should not be gripped from being gripped or the object that is difficult to move from being moved.

As described above, the gripping judgment apparatus 100 according to the present embodiment can judge whether or not the object as the gripping target is grippable by using the hand position, force acting on the hand unit 14, or skidding amount of the object as the physical amount representing movement of the hand unit 14. The judged gripping possibility of the object is stored in the environment map as the immobile object flag. Thus, at the time of gripping and using the object next time, the gripping plan unit 110 can recognize whether or not the object is grippable by referring to the immobile object flag.

<3. A Hardware Configuration Example>

A part of the process performed by the gripping judgment apparatus 100 according to the present embodiment may be implemented by hardware or software. In this case, the gripping judgment apparatus 100 may be constructed as a computer illustrated in FIG. 7. A hardware configuration example of the gripping judgment apparatus 100 according to the present embodiment will be described below with reference to FIG. 7.

Figure 7:
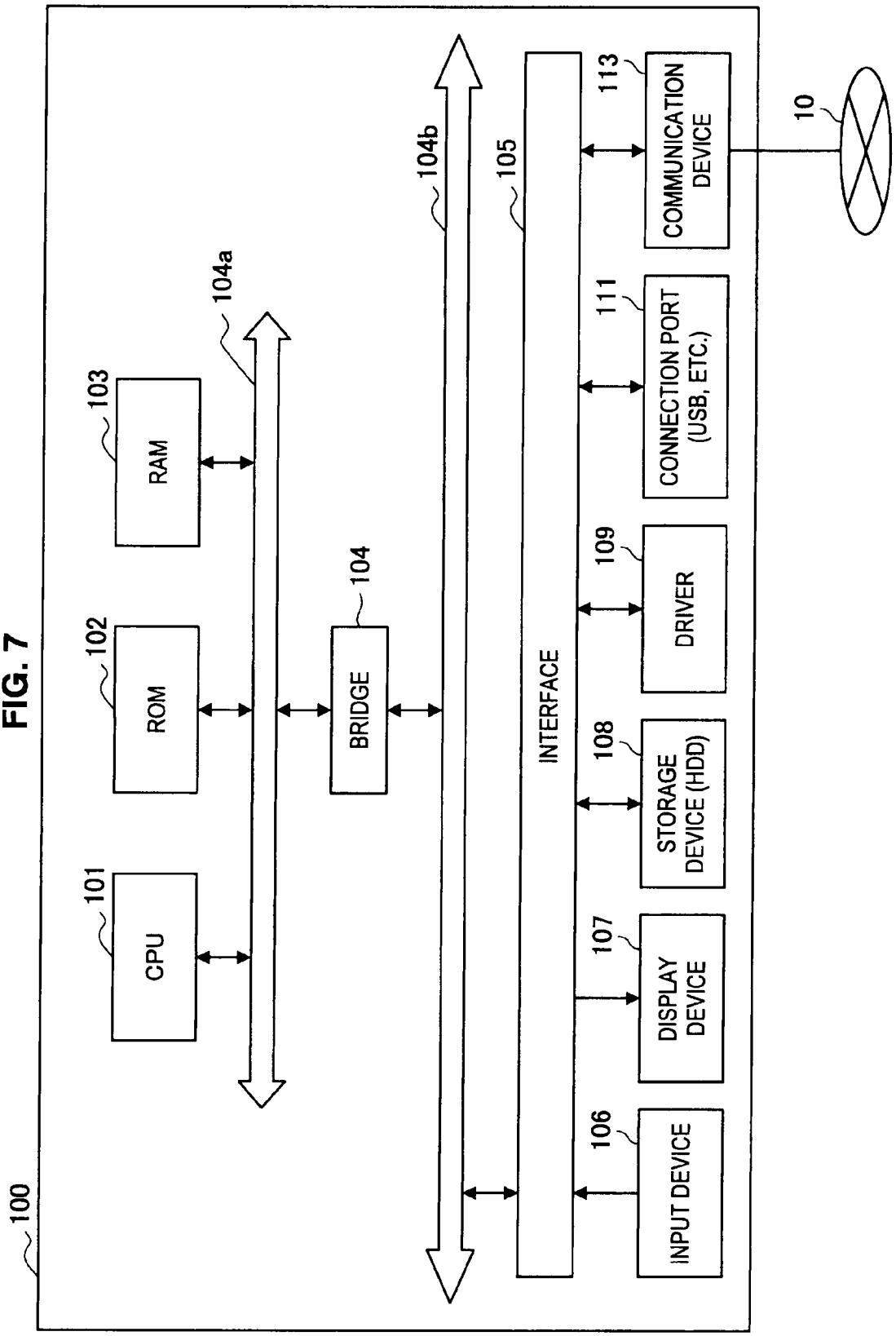
FIG. 7 is a block diagram illustrating an example of a hardware configuration of a gripping judgment apparatus according to the same embodiment.

The gripping judgment apparatus 100 that constructs an input unit according to the present embodiment may be implemented by an information processing apparatus such as a computer as described above and may be installed in an autonomous distributed mobile robot having the manipulator 10. The gripping judgment apparatus 100 includes a central processing unit (CPU) 101, a read only memory (ROM) 102, a random access memory (RAM) 103, and a host bus 104a as illustrated in FIG. 7. The gripping judgment apparatus 100 further includes a bridge 104, an external bus 104b, an interface 105, an input device 106, an output device 107, a storage device (HDD) 108, a driver 109, a connection port 111, and a communication device 113.

The CPU 101 functions as a calculation processing device and a control device and controls the entire operation of the gripping judgment apparatus 100 according to various programs. Further, the CPU 101 may be configured with a microprocessor. The ROM 102 stores a program and a calculation parameter used by the CPU 101. The RAM 103 temporarily stores a program used in execution of the CPU 101 and a parameter that appropriately varies in the execution. The components are connected with each other by the host bus 104a that includes, for example, a CPU bus.

The host bus 104a is connected with the external bus 104b such as a peripheral component interconnect/interface (PCI) bus via the bridge 104. The host bus 104a, the bridge 104, and the external bus 104b need not necessarily be constructed separately, and the functions may be implemented by a single bus.

The input device 106 includes an input unit through which the user inputs information such as a mouse, a keyboard, a touch panel, a button, a microphone, a switch, and a lever and an input control circuit that generates an input signal based on the input from the user and outputs the input signal to the CPU 101. By operating the input device 106, the user can input a variety of data or instruct the gripping judgment apparatus 100 of the robot to perform a processing operation.

The output device 107 includes a display device such as a liquid crystal display (LCD) device, an organic light emitting diode (OLED) device, and a lamp or a voice output device such as a speaker.

The storage device 108 is an example of the storage unit of the gripping judgment apparatus 100 and is an apparatus for data storage. The storage device 108 may include a storage medium, a recording apparatus that records data in a storage medium, an apparatus that reads data from a storage medium, and a deletion apparatus that deletes data recorded in a storage medium. The storage device 108 includes, for example, a hard disk drive (HDD). The storage device 108 drives a hard disk to store a program executed by the CPU 101 or a variety of data.

The driver 109 is a reader/writer for a storage medium and is installed inside or mounted to the gripping judgment apparatus 100. The driver 109 reads information recorded on a removable storage medium such as a mounted magnetic disk, an optical disk, a magnetic optical disk, or a semiconductor memory and outputs the information to the RAM 103.

The connection port 111 is an interface connected with an external apparatus and is a port for a connection with an external apparatus that can transmit data through, for example, a universal serial bus (USB). The communication device 113 is a communication interface that includes a communication device for connecting with a communication network 10. Further, the communication device 113 may include a communication device that supports a local area network (LAN), a communication device that supports a wireless USB, or a wire communication device that performs wire-line communications.

Further, the gripping judgment apparatus 100 according to the present embodiment need not necessarily include the hardware illustrated in FIG. 7. For example, the input device 106, the display device 107, the storage device 108, the driver 109, the connection port 111, and the communication device 113 may be connected with the gripping judgment apparatus 100 and used as an apparatus separate from the gripping judgment apparatus 100.

The exemplary embodiments of the present invention have been described hereinbefore with reference to the accompanying drawings, but the present invention is not limited thereto. A person having ordinary skill in the art would understand that various modifications or variations can be made within the scope of the technical spirit defined in the claims and included within the technical scope of the invention.

The present application contains subject matter related to that disclosed in Japanese Priority Patent Application JP 2010-068274 filed in the Japan Patent Office on Mar. 24, 2010, the entire content of which is hereby incorporated by reference.

What is claimed is:

1. A gripping judgment apparatus, comprising:
circuitry that includes
a plan unit that generates a target orbit for moving a gripping unit in a state in which an object as a gripping target is gripped by the gripping unit;
an observation unit that measures movement of the gripping unit driven based on the target orbit;
a gripping state judgment unit that judges whether or not an object as a gripping target is grippable based on a target value of the gripping unit derived from the target orbit and an actual measured value measured by the observation unit; and
a gripping state change unit that changes a gripping state of an object gripped by the gripping unit based on a judgment result obtained by the gripping state judgment unit
wherein the gripping state judgment unit judges that the object is not grippable when a deviation between the target value and the actual measured value is equal to or more than a predetermined value.

2. The gripping judgment apparatus according to claim 1, wherein the observation unit measures a position of the gripping unit, and the gripping state judgment unit judges whether or not an object as a gripping target is grippable based on a deviation between an actual measured position of the gripping unit measured by the observation unit and a target position of the gripping unit derived from the target orbit.

3. The gripping judgment apparatus according to claim 1 wherein the observation unit measures an acting force acting on the gripping unit when moving the gripping unit in a state in which the object is gripped, and the gripping state judgment unit judges whether or not an object as a gripping target is grippable based on a deviation between actual measured acting force acting on the gripping unit measured by the observation unit and target acting force acting on the gripping unit derived from the target orbit.

4. The gripping judgment apparatus according to claim 1, wherein the observation unit measures a skidding amount occurring between the gripping unit and the object when the object is gripped, and the gripping state judgment unit judges that an object as a gripping target is not grippable when gripping force of the gripping unit on the object is equal to or more than an allowable value and the observation unit measures that skidding occurs between the gripping unit and the object.

5. The gripping judgment apparatus according to claim 1, wherein the gripping state change unit stops gripping the object by the gripping unit when the gripping state judgment unit judges that the object is not grippable.

6. The gripping judgment apparatus according to claim 1, further comprising a gripping state storage unit that stores a judgment result of an object in which a gripping possibility is judged by the gripping state judgment unit and a spatial position of the object in association with each other as an environment map.

7. The gripping judgment apparatus according to claim 6, wherein the plan unit
    judges whether or not an object as a gripping target is not grippable through the gripping state storage unit, and decides not to grip the object when it is judged that the object is not grippable.

8. A gripping judgment method, comprising the steps of:
    generating with processing circuitry a target orbit for moving a gripping unit in a state in which an object as a gripping target is gripped by the gripping unit;
    measuring movement of the gripping unit driven based on the target orbit;
    judging whether or not an object as a gripping target is grippable based on a target value of the gripping unit derived from the target orbit and an actual measured value representing measured movement of the gripping unit; and
    changing a gripping state of an object gripped by the gripping unit based on a judgment result from the judging,
    wherein the judging includes judging that the object is not grippable when a deviation between the target value and the measured value is equal to or more than a predetermined value.

* * * * *